United States Patent
Fujisawa et al.

(10) Patent No.: US 6,785,290 B1
(45) Date of Patent: Aug. 31, 2004

(54) LINE INTERFACE INTEGRATED CIRCUIT AND PACKET SWITCH

(75) Inventors: Toshio Fujisawa, Yokohama (JP); Toshitada Saito, Kawasaki (JP); Jun Hasegawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 820 days.

(21) Appl. No.: 09/694,792

(22) Filed: Oct. 24, 2000

(30) Foreign Application Priority Data

Oct. 25, 1999 (JP) .......................................... 11-302056

(51) Int. Cl.[7] .......................... H04L 12/28; H04L 12/56
(52) U.S. Cl. ...................... 370/419; 370/412; 370/413
(58) Field of Search ................................ 370/412, 413, 370/419, 417, 415, 429, 428, 463, 420, 395.4, 395.7, 395.71, 395.72, 363, 368, 374, 371, 378, 381

(56) References Cited

U.S. PATENT DOCUMENTS

| | | | |
|---|---|---|---|
| 4,156,796 A | * 5/1979 | O'Neal et al. ................. | 178/3 |
| 4,306,303 A | * 12/1981 | Hardy ......................... | 370/368 |
| 4,360,911 A | * 11/1982 | Hardy ......................... | 370/368 |
| 5,475,679 A | * 12/1995 | Munter ..................... | 370/395.4 |
| 5,940,368 A | 8/1999 | Takamichi et al. | |

FOREIGN PATENT DOCUMENTS

| | | | | |
|---|---|---|---|---|
| EP | 817431 A2 | * 1/1998 | ........... | H04L/12/56 |
| EP | 0 817 432 A2 | 1/1998 | | |
| EP | 817434 A2 | * 1/1998 | ........... | H04L/12/56 |
| JP | 10-150443 | 6/1998 | | |
| WO | WO 97/13346 | 4/1997 | | |

* cited by examiner

*Primary Examiner*—Wellington Chin
*Assistant Examiner*—Jamal A. Fox
(74) *Attorney, Agent, or Firm*—Finnegan, Henderson, Farabow, Garrett & Dunner, L.L.P.

(57) ABSTRACT

ATM cells inputted into a physical layer interface (12) are once stored in a cell buffer (24) regardless whether they are ATM cells to be outputted from a switching interface (22) or ATM cells addressed to host CPU (26), and the ATM cells addressed to the host CPU are stored in a temporary RAM (18) at a timing controlled by a scheduler (16). The host CPU 26 read out ATM cells stored in the temporary RAM (18) when necessary. Thereby, no FIFO memory is needed to temporarily store ATM cells addressed to the host CPU (26).

20 Claims, 12 Drawing Sheets

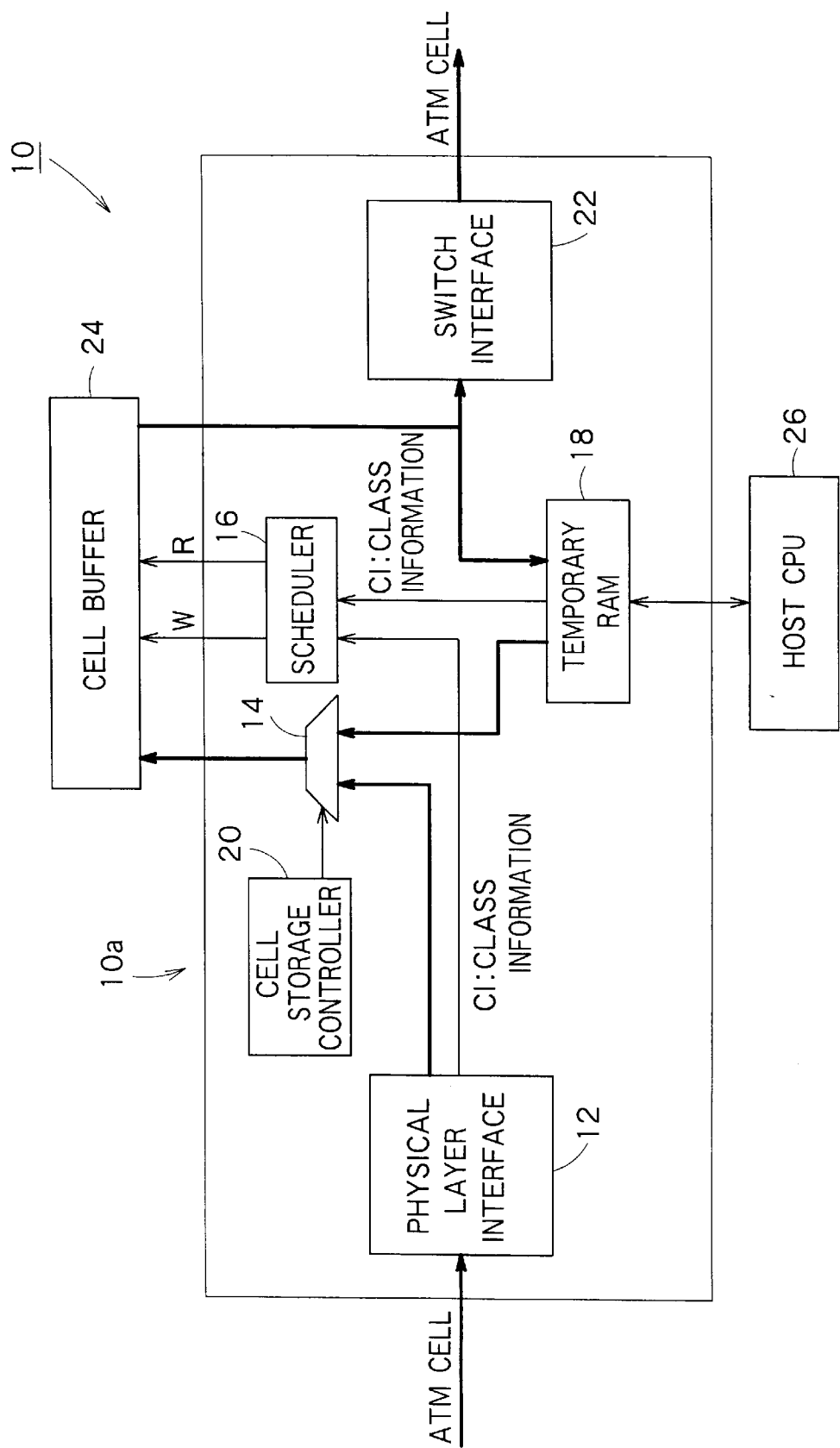
F I G. 1

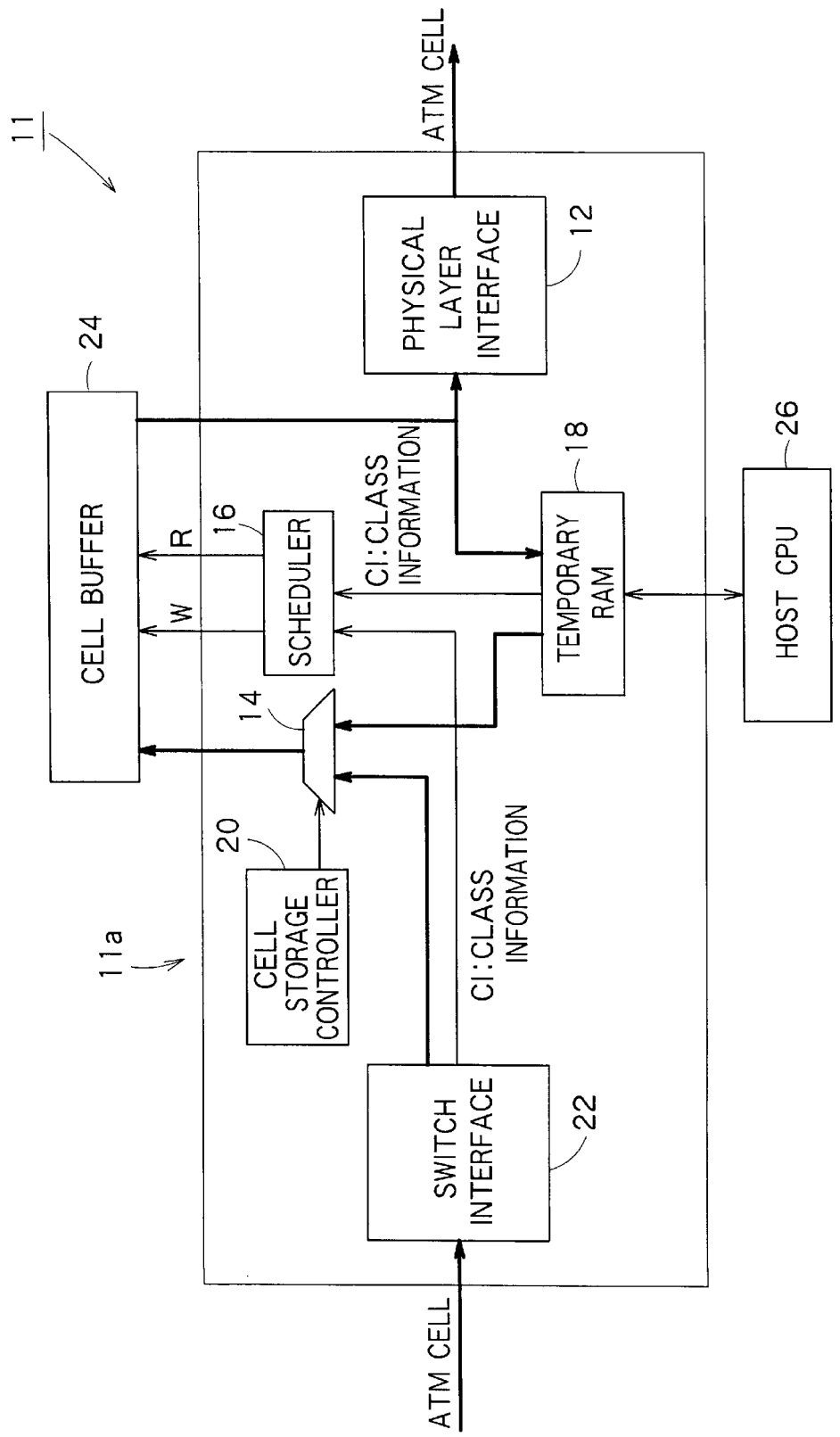
F I G. 3

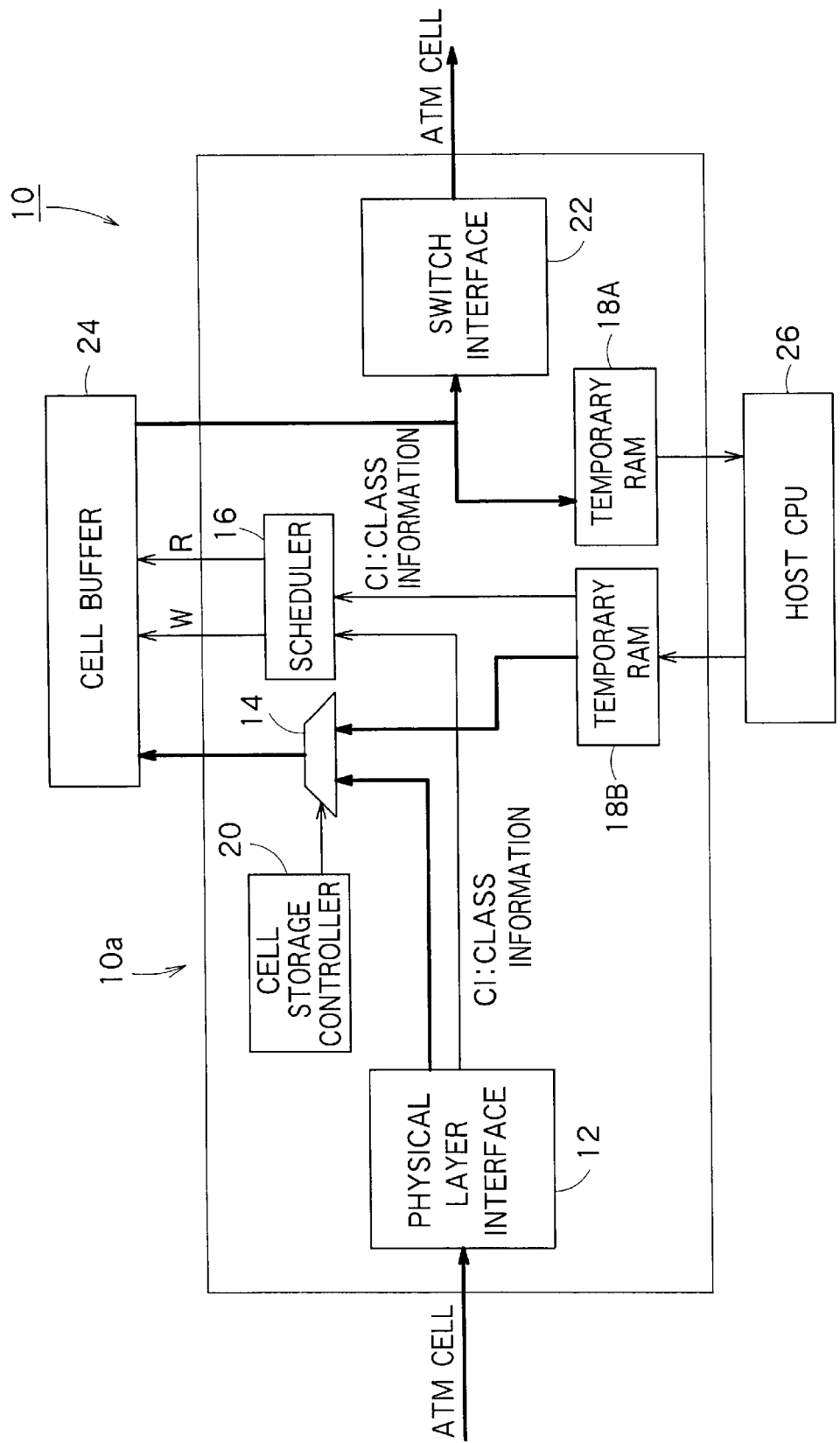
F I G. 8B

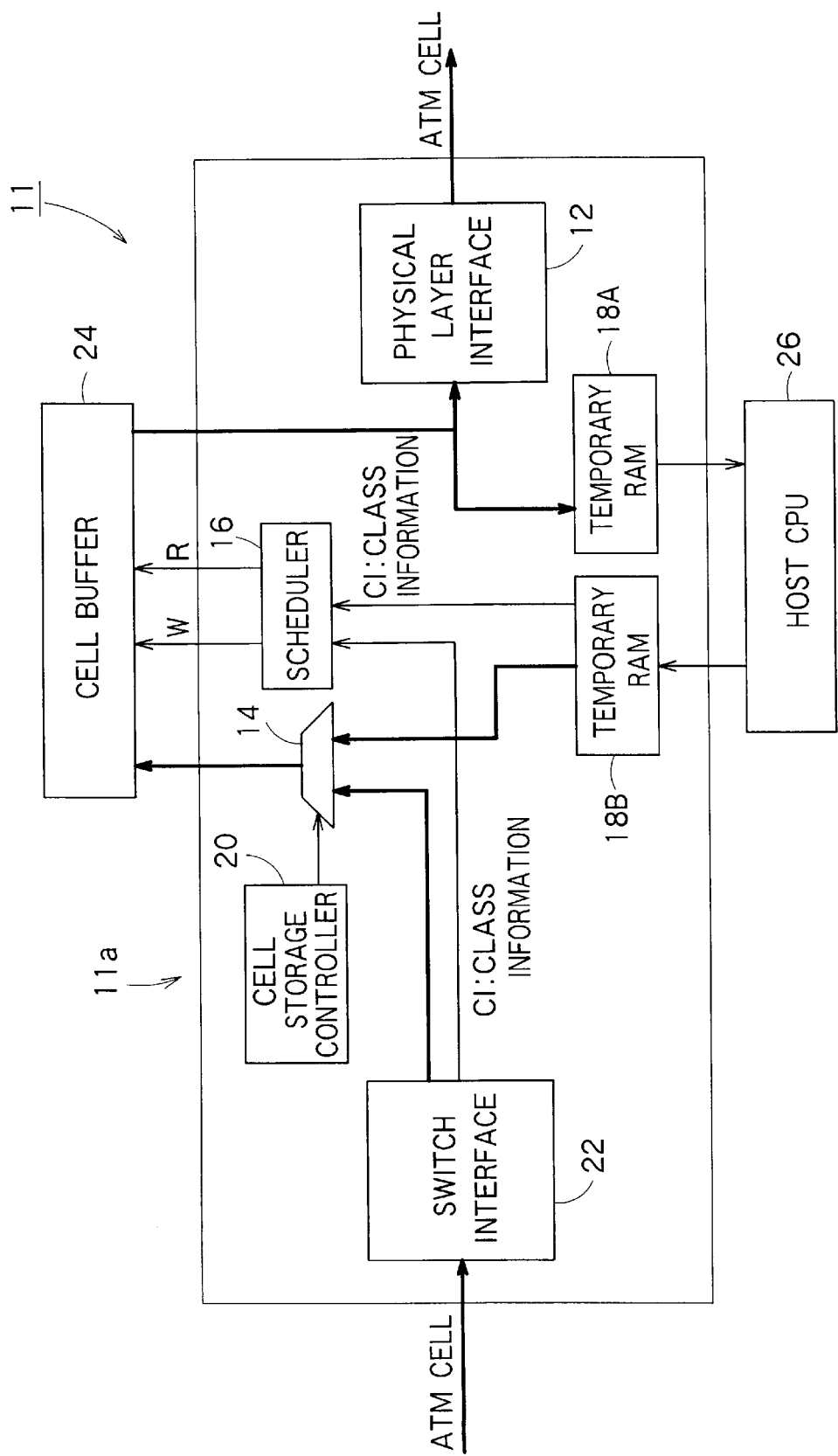
F I G. 8C

LINE INTERFACE INTEGRATED CIRCUIT AND PACKET SWITCH

RELATED APPLICATION

This application claims the benefit of priority under 35 U.S.C. §119 of Japanese Patent Application No. H11-302056, filed on Oct. 25, 1999, the entire contents of which are incorporated by reference herein.

BACKGROUND OF THE INVENTION

1. Field of the Invention

This invention relates to a line interface integrated circuit and a packet switch, and more particularly, to a line interface circuit capable of efficiently inserting or extracting packets, and a packet switch using such a line interface integrated circuit.

2. Description of the Related Background Art

There is an ATM (asynchronous transfer mode) communication network as one of currently widespread communication networks of fixed length packets. ATM networks are used to exchange not only ordinary data cells but also non-data cells for maintenance and management of the ATM networks.

For example, ATM networks can use OAM (operation and maintenance) cells for the purpose of maintenance of the networks. Furthermore, RM (resource management) cells can be also used for the purpose of efficiently using network resources of the ATM networks.

In order to operate and manage an ATM network by using those OAM cells and RM cells, communication terminals or ATM switches are required to insert OAM cells and RM cells into a flow of ordinary data cells or extract OAM cells and RM cells from the flow of ordinary cells. A configuration of an ATM switch of this type is shown in FIG. 9.

As shown in FIG. 9, the ATM switch has physical layer controllers 110(1) through 110(N), line interfaces 112(1) through 112(N), routing switch 114, line interfaces 116(1) through 116(N), and physical layer controllers 118(1) through 118(N).

The line interfaces 112(1) through 112(N) and the physical layer controllers 110(1) through 110(N) are associated with respective input ports. That is, in the example of FIG. 9, there are N input ports. The line interfaces 116(1) through 116(N) and the physical layer controllers 118(1) through 118(N) are associated with respective output ports. That is, in the example of FIG. 9, there are N output ports.

The physical layer controllers 110(1) to 110(N) are connected to physical layers, respectively, and supplied with frame-formatted transmission data from the physical layers. As to these frame-formatted transmission data inputted into physical layer controllers 110(1) to 110(N), ATM cells are extracted from each frame-formatted transmission data and outputted to the line interfaces 112(1) to 112(N). That is, a plurality of ATM cells are stored in one frame.

The line interfaces 112(1) to 112(N) connected between the physical layer controllers 110(1) to 110(N) and the routing switch 114 function to add information required for routing the ATM cells in the routing switch 114 to ATM cells, rewrite headers of ATM cells, and so on. The line interfaces 112(1) to 112(N) also function to temporarily store ATM cells to be outputted to the routing switch 114 and output them to the routing switch 114, depending upon the processing status of the routing switch 114. The line interfaces 112(1) to 112(N) are concerned in processing ATM cells from the physical layer controllers 110(1) to 110(N) toward the routing switch 114, and the part of the ATM switch where these ATM cells enter into the routing switch 114 is hereinafter called the ingress side.

ATM cells outputted from the line interfaces 112(1) to 112(N) are inputted to the routing switch 114. By switching function of the routing switch 114 based on header information of the ATM cells, these ATM cells are outputted to a corresponding one of line interfaces 116(1) to 116(N), respectively.

The line interfaces 116(1) to 116(N) temporarily store ATM cells inputted from the routing switch 114 and sequentially output them to the physical layer controllers 118(1) to 118(N) as soon as the output port is unoccupied. The line interfaces 116(1) to 116(N) are concerned in processing ATM cells from the routing switch 114 toward the physical layer controllers 118(1) to 118(N), and the part of the ATM switch where these ATM cells are outputted from the routing switch 114 is hereinafter called the egress side.

Based on ATM cells inputted into the physical layer controllers 118(1) through 118(N), frame-formatted transmission data are generated in the physical layer controllers 118(1) to 118(N), and the transmission data is outputted from a physical layer.

In case of an ATM switch having configuration as shown in FIG. 9, insertion and extraction of the OAM cells or the RM cells are often conducted in the ingress-side line interfaces 112(1) to 112(N) and/or egress-side line interfaces 116(1) to 116(N). Configuration of line interfaces 112(1) to 112(N) having such functions of inserting and extracting of the OAM cells and the RM cells is shown in FIG. 10. FIG. 10 illustrates configuration of an ingress-side line interface 112(1) as an example.

With reference to FIG. 10, explanation is made below about the process of ordinary data cells passing through the conventional line interface 112(1).

ATM cells inputted from the physical layer controller 110(1) are classified in a physical layer interface 130. Based on the classification, class information CI is notified from the physical layer interface 130 to a scheduler 132. The class information CI indicates an identification number of a queue formed in a cell buffer 134. The scheduler 132 manages the queues, each of which corresponds to the class.

The scheduler 132 in receipt of the class information CI outputs a write request W to write ATM cells to the cell buffer 134. Responsively, ATM cells are stored in the cell buffer 134 via a cell storage controller 131. The scheduler 132 writes data of a single ATM cell in the cell buffer 134, and thereafter adds one entry in a class queue the ATM cell belongs to, and increases the length of the queue by one. Herein below, let it called "enqueue" to write data of an ATM cell in the cell buffer 134 and increase the length of a queue the ATM cell belongs to.

The scheduler 132 selects any queue or queues equal to or longer than 1 from a plurality of queues provided for individual classes, and selects only one to be outputted with the highest priority. The scheduler 132 extracts the forefront one entry of the selected queue, and a data read request to read data of the ATM cell that entry belongs to. Herein below, let it called "dequeue" to read out cell data from the cell buffer 134 and decrease the length of the queue the ATM cell belongs to.

Next referring to FIG. 10, explanation is made about operations in the line interface 112(1) for extracting an OAM cell and RM cell, and operations therein for inserting an OAM cell and RM cell.

The physical layer interface 130 manages information for individual lines, such as line qualities (class information CI), cell passing frequencies, etc. When the physical layer interface 130 decides on the basis of contents of input cells and line information that an ATM cell inputted is addressed to the host CPU, it writes the data of the ATM cell in a FIFO memory 136 prepared separately, instead of the cell buffer 134.

The FIFO memory 136 is capable of storing a plurality of ATM cell data. The host CPU 150 connected to the line interface 112(1) has the function of sequentially reading out ATM cell data from the FIFO memory 136 into temporary RAM 138, the function of delivering information obtained therefrom to application software, and other functions.

On the other hand, for inserting an OAM cell or RM cell, the host CPU 150 first writes data of the ATM cell to be inserted in the temporary RAM 138, and requests a cell insertion controller 140 to next insert the ATM cell. The cell insertion controller 140 outputs ATM cells stored in the temporary RAM 138 through a selector 142 to a switch interface 144 when, for example, there are no cell to be dequeued.

However, the line interface 112(1) explained above with reference to FIG. 10 involves the following problem. That is, since it was undefined how often OAM cells or RM cells arrive, the FIFO memory 136 was required to have an amply large capacity with a margin taking the processing speed of the host CPU 150 into consideration. However, even if using a FIFO memory 136 having an ample margin, when OAM cells or RM cells addressed to the host CPU 150 arrived successively, they might exceed the capacity of the FIFO memory 136.

Additionally, even when the scheduler 132 tried to output ATM cells, which are ordinary data cells, from the switch interface 144 so as to maintain a predetermined line quality, there was the possibility that OAM cells or RM cells inserted from the host CPU 150 invited a delay of ATM cells, which are ordinary data cells. Moreover, since the selector 142 had to be controlled to minimize such a delay of data cells, the control mechanism of the cell insertion controller 140 was indispensably complicated.

SUMMARY OF THE INVENTION

It is therefore an object of the invention to provide a line interface not requiring particular attention to capacity of a FIFO memory, and an ATM switch as a kind of packet switches using such line interfaces.

In other words, it is the object of the invention to provide a line interface integrated circuit capable of inserting non-data cells for maintenance and management purposes into a flow of ordinary data ATM cells without disordering the flow of the ATM cells and extracting non-data cells from a flow of ATM cells, and an ATM switch as one of packet switches using such line interface integrated circuit.

In order to accomplish the aforementioned and other objects, according to one aspect of the present invention, a line interface integrated circuit having an input-side interface supplied with packets and an output-side interface outputting the packets, comprising:

a first storage device configured to temporarily store packets toward CPU and be accessed by the CPU when necessary; and a scheduler configured to classify packets outputted from the input-side interface at least into a first queue for accumulating packets to be outputted from the output-side interface and a second queue for accumulating packets addressed to CPU, and accumulate the packets in a buffer, the scheduler managing the order of outputting the packets accumulated in the queues of the buffer to output the packets accumulated in the first queue to the output-side interface and output the packets accumulated in the second queue to the first storage device.

According to another aspect of the present invention, a packet switch comprising:

at least one ingress-side physical layer controller connected to a physical layer which is an input side of the packets;

at least one ingress-side line interface device connected to the ingress-side physical layer controller;

a routing switch connected to the ingress-side line interface device;

at least one egress-side line interface device connected to the routing switch; and at least one egress-side physical layer controller having one side connected to the egress-side line interface device and the other side connected to a physical layer which is the output side of the packets, wherein each line interface device of the ingress-side line interface device and the egress-side line interface device comprises;

an input-side interface supplied with the packets;

an output-side interface outputting the packets;

a buffer supplied with packets outputted from the input-side interface and accumulating the packets classified at least into a first queue for accumulating packets to be outputted from the output-side interface and a second queue for accumulating packets addressed to CPU;

a first storage device configured to temporarily store packets outputted from the buffer toward the CPU and be accessed by the CPU when necessary; and a scheduler configured to manage the order of outputting the packets accumulated in the queues of the buffer to output the packets accumulated in the first queue to the output-side interface and output the packets accumulated in the second queue to the first storage device.

According to a further aspect of the present invention, a line interface integrated circuit having a physical layer interface connected to a physical layer controller to input and output packets, and a switch interface connected to a routing switch to output and input packets, comprising:

first and second storage devices configured to temporarily store packets toward CPU and being accessed by the CPU when necessary;

an ingress-side scheduler configured to classify the packets outputted from the physical layer interface at least into a first queue for accumulating packets to be outputted from the switch interface and a second queue for accumulating packets addressed to the CPU, and accumulate the packets in an ingress-side buffer, the ingress-side scheduler managing the order of outputting the packets accumulated in the queues of the ingress-side buffer to output the packets accumulated in the first queue to the switch interface and output the packets accumulated in the second queue to the first storage device; and an egress-side scheduler configured to classify the packets outputted from the switch interface at least into a third queue for accumulating packets to be outputted from the physical layer interface and a fourth queue for accumulating packets addressed to the CPU, and accumulate the packets in an egress-side buffer, the egress-side scheduler managing the order of outputting the packets accumulated in the queues of the egress-side buffer to output the packets accumulated in the third queue to the physical layer interface and output the packets accumulated in the fourth queue to the second storage device.

According to a still further aspect of the present invention, a packet switch comprising:

at least one physical layer controller connected to a physical layer;

at least one line interface device connected to the physical layer controller; and a routing switch connected to the line interface device wherein the line interface device comprises:

a physical layer interface connected to the physical layer controller to input and output packets;

a switch interface connected to the routing switch to output and input packets;

an ingress-side buffer supplied with the packets outputted from the physical layer interface, and accumulating the packets classified at least into a first queue for accumulating packets to be outputted from the switch interface and a second queue for accumulating packets addressed to CPU;

a first storage device configured to temporarily store packets outputted from the ingress-side buffer toward the CPU and be accessed by the CPU when necessary;

an ingress-side scheduler configured to manage the order of outputting the packets accumulated in the queues of the ingress-side buffer to output the packets accumulated in the first queue to the switch interface and output the packets accumulated in the second queue to the first storage device;

an egress-side buffer supplied with the packets outputted from the switch interface, and accumulating the packets classified at least into a third queue for accumulating packets to be outputted from the physical layer interface and a fourth queue for accumulating packets addressed to the CPU;

a second storage device configured to temporarily store packets outputted from the egress-side buffer toward the CPU and be accessed by the CPU when necessary; and an egress-side scheduler configured to manage the order of outputting the packets accumulated in the queues of the egress-side buffer to output the packets accumulated in the third queue to the physical layer interface and output the packets accumulated in the fourth queue to the second storage device.

BRIEF DESCRIPTION OF THE DRAWINGS

FIG. 1 is a block diagram which shows internal configuration of an ingress-side line interface according to the first embodiment of the invention;

FIG. 3 is a block diagram which shows internal configuration of an egress-side line interface according to the first embodiment of the invention;

FIG. 8B is a block diagram showing an ingress-side line interface which is made a modification to the first embodiment;

FIG. 8C is a block diagram showing an egress-side line interface which is made a modification to the first embodiment;

DETAILED DESCRIPTION OF THE PREFERRED EMBODIMENTS (First Embodiment)

A line interface according to the first embodiment of the invention is configured to once store in a cell buffer any ATM cells inputted to an input-side interface, either those to be outputted from an output- side interface or those addressed to host CPU, and permits the host CPU to read out cells addressed to the host CPU at a timing under control by a scheduler. It thereby enables to omit a FIFO memory for temporarily storing ATM cells addressed to the host CPU.

Further, the line interface according to the first embodiment of the invention is configured to store ATM cells inserted by the host CPU in the cell buffer as a part of ATM cells to be outputted from the output-side interface such that they are outputted from the output-side interface at a timing under control by the scheduler. It thereby enables to send out the ATM cells inserted by the host CPU from the output-side interface without disordering the flow of ordinary ATM cells. The line interface is explained below in greater detail.

Figure 9:
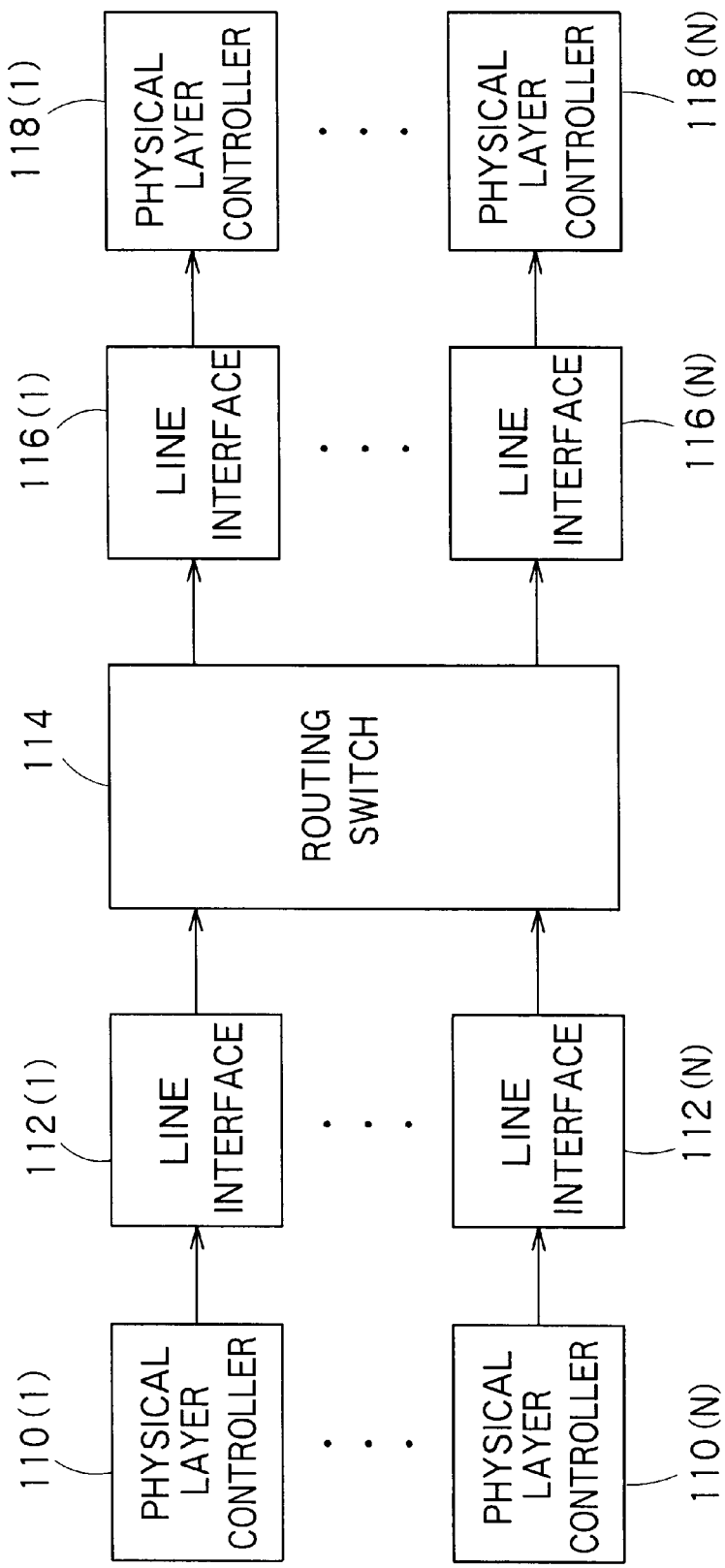
FIG. 9 is a block diagram which shows interior configuration of a conventional ATM switch.
Figure 10:
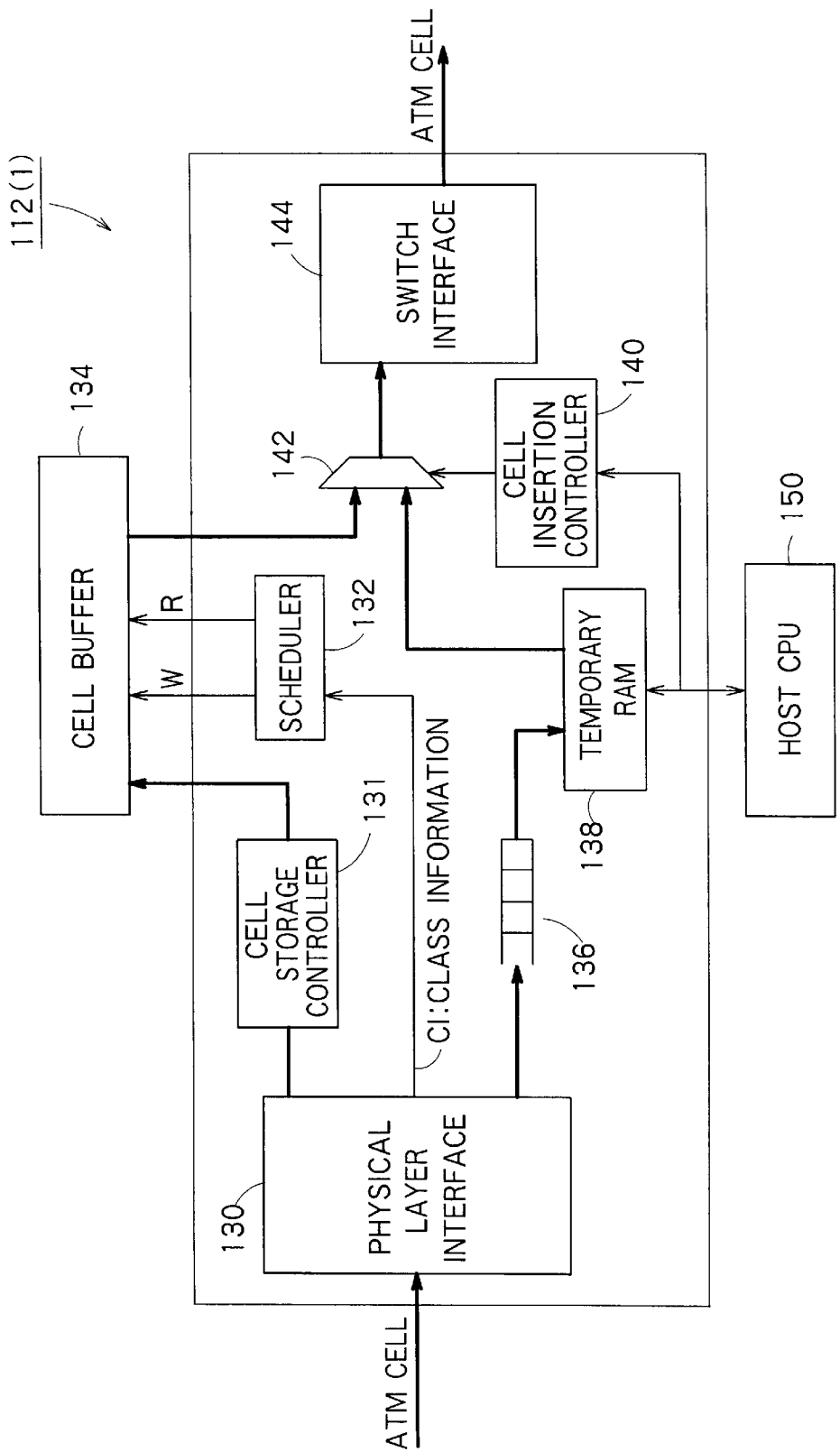
FIG. 10 is a block diagram which shows internal configuration of a conventional line interface.

FIG. 1 is a block diagram that shows internal configuration of the line interface according to the first embodiment of the invention. FIG. 1 shows a line interface corresponding to an ingress-side line interface shown in FIG. 9.

As shown in FIG. 1, the line interface 10 includes a physical layer interface 12, selector 14, scheduler 16, temporary RAM 18, cell storage controller 20, switching interface 22, cell buffer 24 and host CPU 26.

In the embodiment shown here, the host CPU 26 is provided for each line interface 10, but a single host CPU 26 may be provided for a plurality of line interfaces 10. Furthermore, in this embodiment, the physical layer interface 12, selector 14, scheduler 16, temporary RAM 18, cell storage controller 20 and switching interface 22 are formed in a single integrated circuit 10a.

Figure 2:
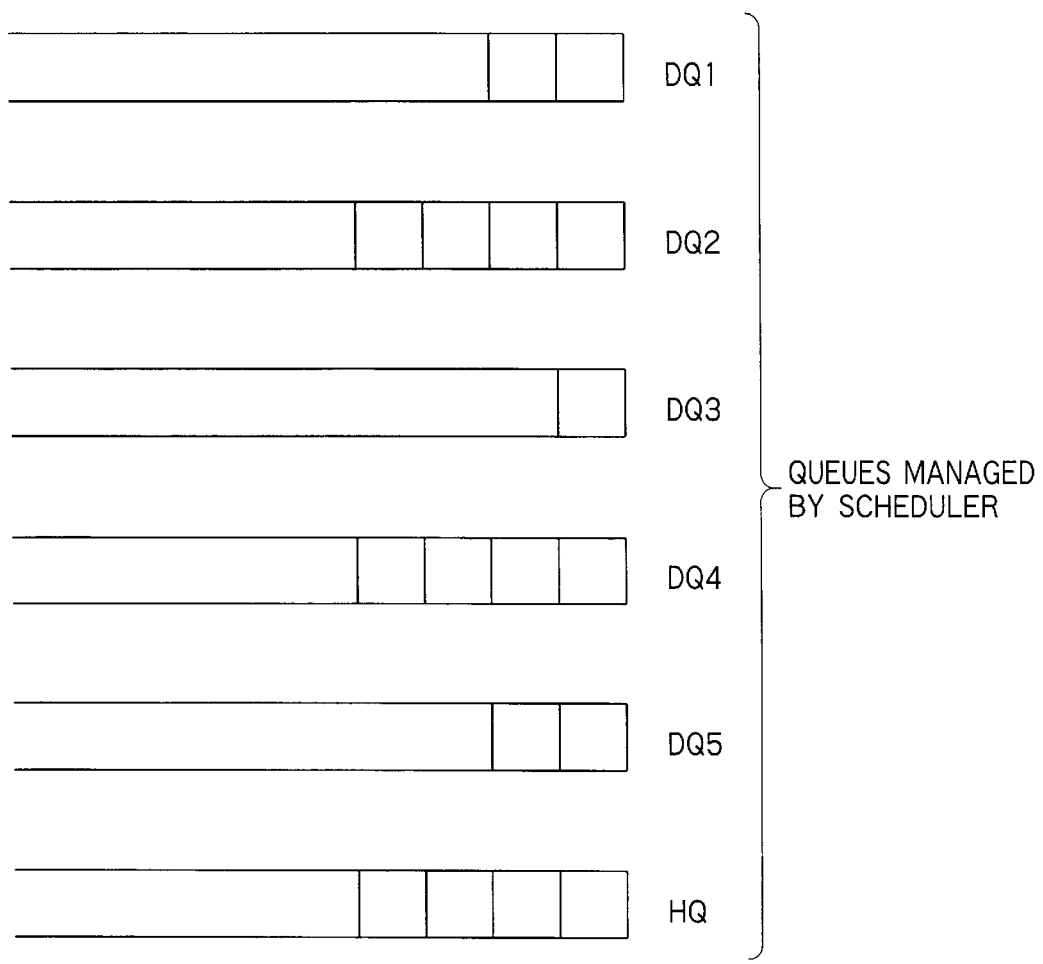
FIG. 2 is a diagram which schematically showing aspects of queues formed in a cell buffer.

FIG. 2 is a diagram that schematically shows queues the scheduler 16 manages. As shown in FIG. 2, in the embodiment shown here, the scheduler 16 manages a host queue HQ addressed to the host CPU 26 in addition to data queues DQ1 through DQ5 of five classes different in priority. These five data queues DQ1 to DQ5 may correspond to ATM service categories, CBR, rt-BVR, nrt-VBR, UBR and ABR, for example.

In the line interface 10 having the configuration shown in FIG. 1, when ATM cells are inputted to the physical layer interface 12, the line interface 10 functions as follows.

When ATM cells are input to the physical interface 12, the ATM cells are once written in the cell buffer 24. For writing the ATM cells from the physical interface 12 in the cell buffer 24, the cell storage controller 20 first sets the selector 14 for the physical layer interface 12 to introduce ATM cells from the physical layer interface 12 into the cell buffer 24.

The physical layer interface 12 distinguishes the class of the ATM cells inputted thereto by the contents of the ATM cells and line information, and at the same time, determines whether the ATM cells are addressed to the host CPU 26 or should be sent out from the switch interface 22.

If an ATM cell is ordinary ATM cell to be sent out from the switch interface 22, the physical layer interface 12 transmits class information CI of the ATM cell to the scheduler 16. In receipt of the class information CI, the scheduler 16 issues a write command W for writing the ATM cells to the cell buffer 24. The cell buffer 24 having received the write command W stores data of the ATM cell in a data queue having a corresponding priority selected from the data queues DQ1 to DQ5 formed in the cell buffer 24. That is, the cell buffer 24 enqueues it to one of the data queues DQ1 to DQ5.

In contrast, if an ATM cell inputted into the physical interface 12 is addressed to the host CPU 26, then the physical layer interface 12 gives the scheduler 16 class information CI that informs it is the ATM cell addressed to the host CPU 26. As already explained above, there are OAM cells, RM cells, etc. as ATM cells addressed to the host CPU 26. In receipt of the class information CI indicating that it is the ATM cell addressed to the host CPU 26, the scheduler 16 issues a write command W for writing data of the ATM cells to the host queue HQ in the cell buffer 24. The cell buffer 24 having received the write command W stores data of the ATM cell in the host queue HQ formed in the cell buffer 24. That is, the cell buffer 24 enqueues it in the host queue HQ.

In this manner, the ATM cells inputted into the physical layer interface 12 are classified and stored in the cell buffer 24 regardless they are ordinary ATM cells to be sent out from the switch interface 22 or ATM cells addressed to the host CPU 26. That is, ordinary ATM cells are stored in one of the data queues DQ1 to DQ5 formed in the cell buffer 24 whereas ATM cells, such as OAM cells or RM cells, for example, addressed to the host CPU 26 are stored in the host queue HQ.

ATM cells stored in the cell buffer 24 are sequentially outputted to the switch interface 22 or temporary RAM 18 under management of the scheduler 16. That is, the scheduler 16 dequeues them from the data queues DQ1 to DQ5 and the host queue HQ in the order of priorities.

More specifically, when the host CPU 26 detects that the length of the host queue HQ is 1 or more, it requests the scheduler 16 to dequeue data from the host queue HQ. In this case, the scheduler 16 selects one of queues having a length not smaller than 1 and the highest output priority from the data queues DQ1 to DQ5 and the host queue HQ, and makes it dequeue. Therefore, the scheduler 16 makes the host queue HQ dequeue after all ATM cells stored in queues having higher priorities than that of the host queue HQ are outputted to the switch interface 22. Although the priority of the host queue HQ can be determined as desired, the embodiment shown here assigns a lower priority than those of the data queues DQ1 to DQ5.

In the case where the scheduler 16 makes the host queue HQ dequeue, the ATM cell is not sent from the switch interface 22, and it is stored in the temporary RAM 18. In this manner, the host CPU 26 sequentially reads out data of ATM cells from the host queue HQ to the temporary RAM 18, and delivers information obtained from the ATM cells to application software.

The explanation made above has been directed to functions for extracting ATM cells addressed to the host CPU 26 from a flow of ordinary ATM cells inputted to the physical layer interface 12. Next explained below are functions executed when the host CPU inserts ATM cells into a flow of ordinary ATM cells.

To the CPU 26, insertion requests that request insertion of ATM cells such as OAM cells and/or RM cells are sent from other line interfaces. In order that the host CPU 26 inserts such an ATM cell being sent, the host CPU 26 first writes data of the ATM cell to be inserted into the temporary RAM 18. After that, the host CPU 26 requests the scheduler 16 to insert the ATM cell. Subsequently, the temporary RAM 18 transmits class information CI to the scheduler 16. In receipt of the class information CI, the scheduler 16 enqueues the ATM cell written in the temporary RAM 18 into a queue of a class indicated by the class information CI among the data queues DQ1 to DQ5. For writing the ATM cells from the temporary RAM 18 in the cell buffer 24, the cell storage controller 20 first sets the selector 14 for the temporary RAM 18 to introduce the ATM cell from the temporary RAM 18 into the cell buffer 24.

The inserted ATM cells accumulated in the data queues DQ1 to DQ5 are sent out from the switch interface 22 under control of the scheduler 16 according to their priorities.

As explained above, according to the line interface 10 of the instant embodiment, since data of ATM cells addressed to the host CPU 26 are stored in the cell buffer together with ordinary ATM cells, it needs no FIFO memory for storing data of ATM cells addressed to the host CPU 26. It contributes to simplification of hardware configuration.

Additionally, since ATM cells inserted by the host CPU 26 are also accumulated in selected one of the data queues DQ1 to DQ5 in the cell buffer 24 similarly to ordinary ATM cells and sent out from the switch interface 22 at a timing controlled by the scheduler 16 in accordance with priorities, ATM cells inserted by the host CPU 26 can be inserted without disordering the flow of ATM cells. Therefore, the embodiment can prevents the problem that ATM cells inserted from the host CPU 26 cause a delay of dispatch of ordinary ATM cells. Additionally, the embodiment can omit the cell insertion controller that was indispensable conventionally to control the timing of inserting ATM cells from the host CPU 26 into a flow of ordinary ATM cells.

The instant embodiment has been explained about features and effects of one embodiment of the invention on the basis of the ingress-side line interface of FIG. 1, this is also applicable to the egress-side line interface shown in FIG. 3. Note, however, a single integrated circuit 11a of that the egress-side line interface 11 has the switch interface 22 as its interface in the input side of ATM cells, and the physical interface 12 as its interface in the output side of the ATM cells.

(Second Embodiment)

The second embodiment of the invention is directed to incorporating the ingress-side line interface and the egress-side line interface integrated circuit in the first embodiment into one. That is, the line interface integrated circuit is made of LSI of one chip, f or example, so as to implement both the ingress-side function and the egress-side function.

Figure 4:
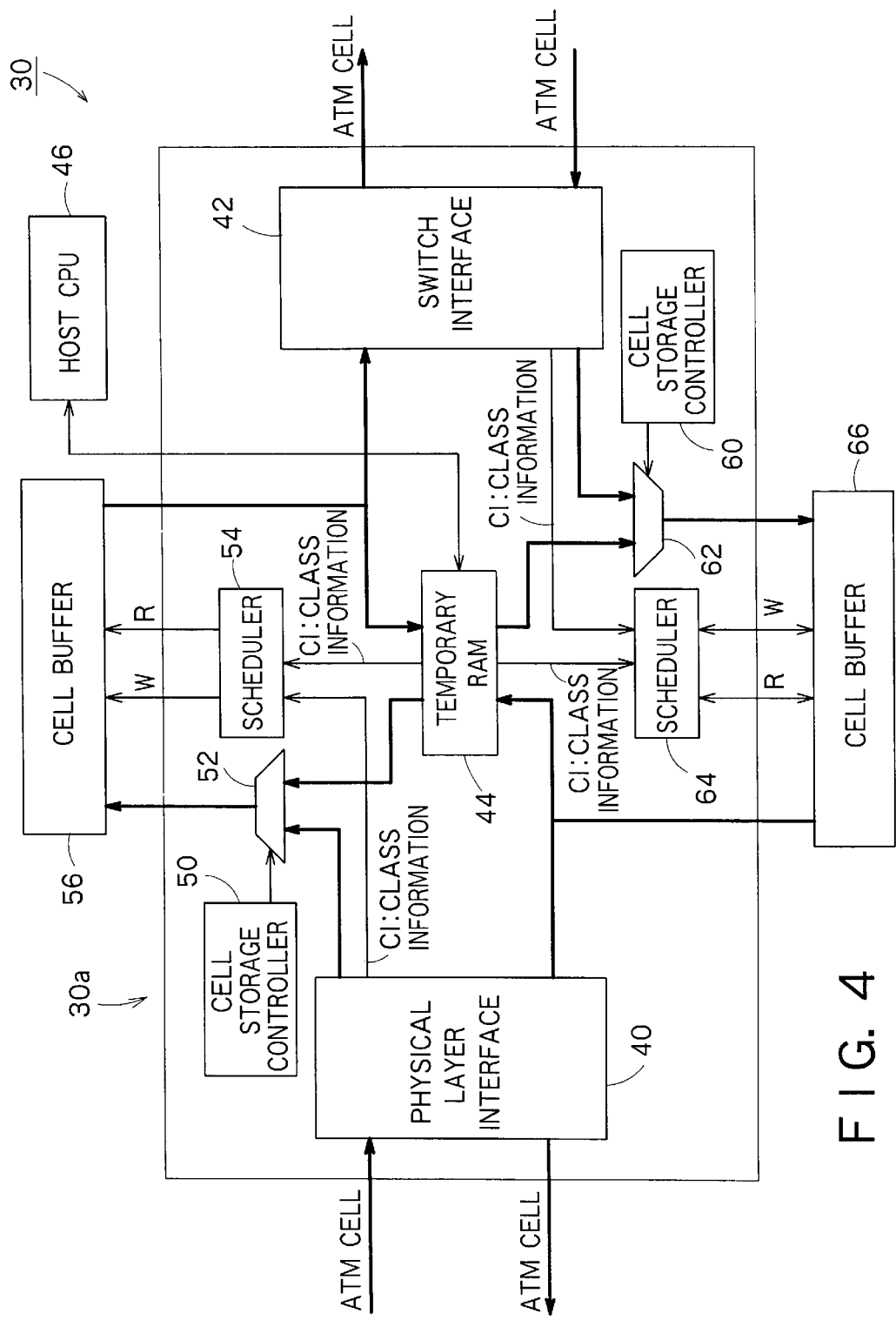
FIG. 4 is a block diagram which shows internal configuration of a line interface according to the second embodiment of the invention.

FIG. 4 is a block diagram that shows internal configuration of the line interface having the ingress-side and egress-side functions. As shown in FIG. 4, the line interface 30 according to the second embodiment includes a physical layer interface 40, switch interface 42, temporary RAM 44 and host CPU 46, which are common to the ingress side and the egress side. In the embodiment shown here, the host CPU 46 is provided for each line interface 30, but a single host CPU 46 may be provided for a plurality of line interfaces 30.

The line interface 30 also includes a cell storage controller 50, selector 52, scheduler 54 and cell buffer 56 which are engaged in ingress-side processing, and further includes a cell storage controller 60, selector 62, scheduler 64 and cell buffer 66 which are engaged in egress-side processing.

In the embodiment shown here, the ingress-side cell buffer 56 and the egress-side cell buffer 66 are provided separately. However, the ingress-side and egress-side cell buffers 56 and 66 may be a single memory in its physical form, provided its addresses are separated for the ingress-side use and the egress-side use. Furthermore, in this embodiment, the physical layer interface 40, switch interface 42, temporary RAM 44, cell storage controller 50, selector 52, scheduler 54, cell storage controller 60, selector 62 and scheduler 64 are formed in a single integrated circuit 30a.

In the interface 30 having the configuration shown in FIG. 4, ATM cells accumulated in an ingress-side queue can be moved to an egress-side queue, and ATM cells accumulated in an egress-side queue can be moved to an ingress-side queue. Consideration is made here about the meaning of moving ATM cells between the ingress side and the egress side.

Figure 5:
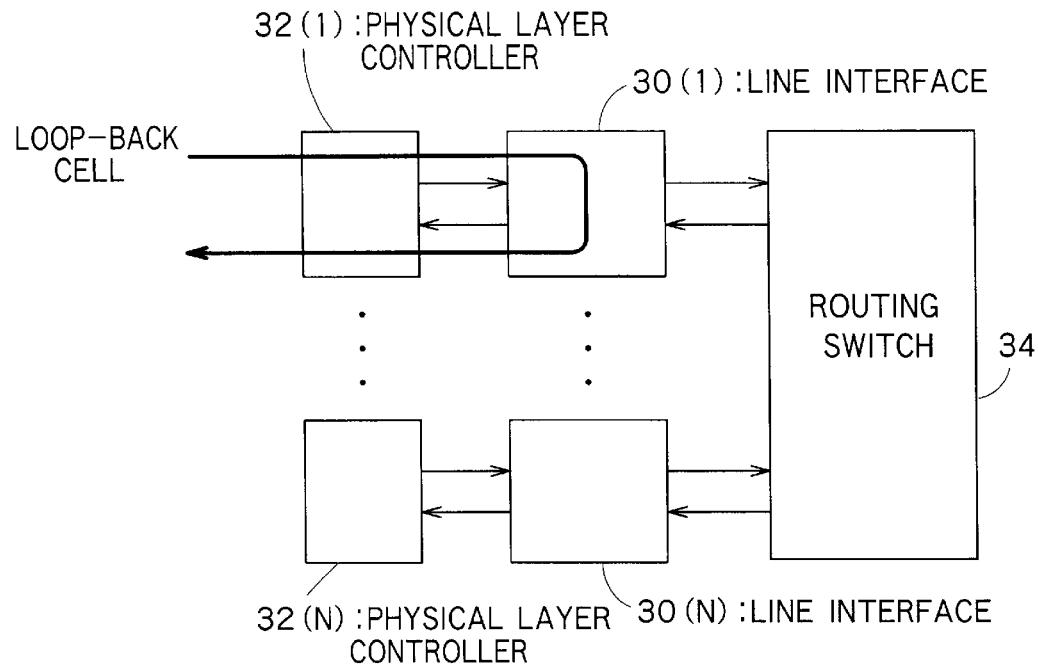
FIG. 5 is a diagram which illustrates a function of turning back loop back cells at line interfaces in an ATM switch using line interfaces as shown in FIG. 4.

FIG. 5 shows an example of the ATM switch using line interfaces 30 having both the ingress-side function and the egress-side function as shown in FIG. 4. As shown in FIG. 5, the ATM switch includes line interfaces 30(1) to 30(N), physical layer controllers 32(1) to 32(N) and routing switch 34.

First made is a review about a way of dealing loop-back cells on a network. Loop-back cells, a kind of OAM cells, are used when conducting a breakage test of lines. Whether a line is broken or not is examined by confirming whether a loop-back cell inputted from a certain point returns within a predetermined time or not. By conducting such a loop-back test, any sender can detect in a self-supporting manner whether a connection is normal or not.

In the case where the ATM switch is selected as a return point of a loop-back cell, it is necessary to move the loop-back cell from a downstream line to an upstream line in the ATM switch. It is also necessary to partly rewrite the contents of payload at the return point. If the line interfaces 30 shown in FIG. 4 are used, those functions can be realized easily.

As shown in FIG. 5, when a loop-back cell arrives at the ATM switch using the line interfaces 30(1) to 30 (N) shown in FIG. 4, it may be returned back inside the line interface 30(1) to 30(N). For example, in the case where a loop-back cell is inputted from the physical layer controller 32(1) to the line interface 30(1), the loop-back cell may be moved from the ingress side to the egress side inside the line interface 30(1). That is, at the point of time where the loop-back cell is stored in the temporary RAM 44 shown in FIG. 4, the host CPU 46 can rewrite the payload and make the cell loop back.

Next made is a review about a way of dealing a BECN cell on a network. BECN (backward explicit congestion notification) cells are ATM cells that explicitly inform a sender that there is congestion on a line. Since BECN cells are a kind of RM cells, a way of dealing RM cells is first explained.

RM cells are called in different ways depending on which of a downstream line and an upstream line they flow in. RM cells flowing from a sender toward a receiver are called forward RM cells whereas RM cells flowing from a receiver toward a sender are called backward RM cells. Forward RM cells pass through several ATM switches after being outputted from a sender terminal until reaching a receiver. Each of ATM switches having received a forward RM cell compares the maximum rate the ATM switch can process with the rate recorded in the forward RM cell, and allows the RM cell written with the smaller value to flow down stream. When the forward RM cell reaches a receiver, the receiver outputs it as a backward RM cell back to the sender.

Backward RM cells similarly pass through several ATM switches until reaching the receiver. Each of ATM switches having received a backward RM cell compares the rate recorded in the backward RM cell with the maximum rate the ATM switch can process, and have the smaller value written in the RM cell.

As a result, in the RM cell having reached the sender, the maximum rate usable in the line is recorded in the payload. The sender is informed of the maximum sending rate of the line used, from the contents of the backward RM cell, and adjusts the output rate. By using RM cells as explained above, the ATM network can be operated efficiently.

However, in the case where ATM switches on the downstream line are extraordinarily congested, it takes a long time for forward RM cells to reach a receiver. In order to efficiently use the network, the sender has to quickly lower the output rate. However, due to the congestion of ATM switches, the sender cannot know it immediately. Taking it into consideration, in the case where a forward RM cell is inputted toward a downstream line under extraordinary congestion, the ATM switches are configured to be able to return the RM cell back toward the upstream line. Forward RM cells returned back halfway are called BECN cells.

In order for an ATM switch to process a BECN cell, it has to know the state of congestion of the output port, namely, the length of the queue in the output side. In considerable cases, the egress side of the line interface has such information. Additionally, in order to process BECN cells, it is necessary to move forward RM cells from their downstream line to the upstream line. This function can be realized easily by using the line interfaces 30 shown in FIG. 4.

Figure 6:
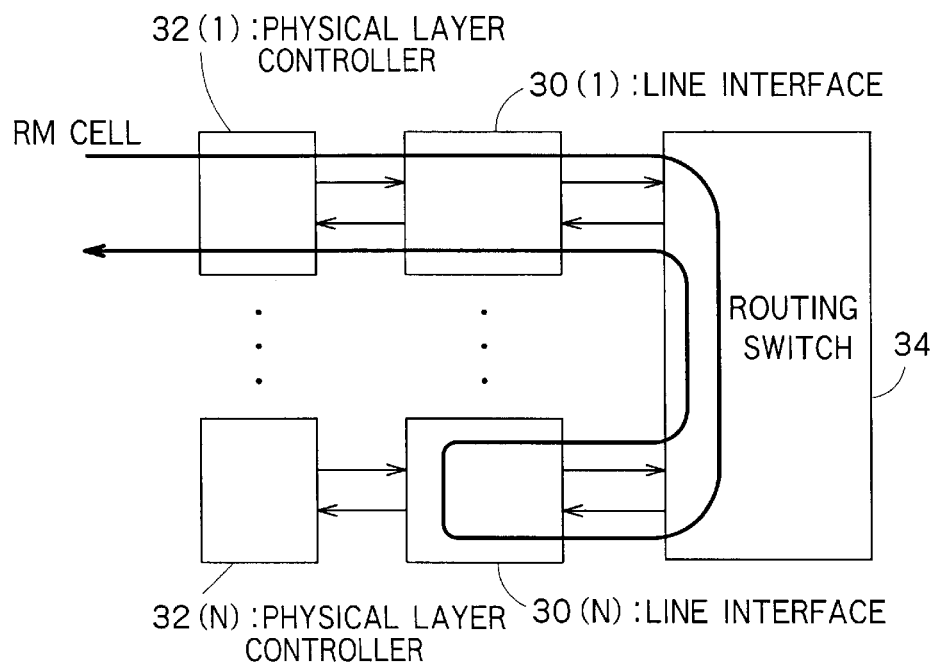
FIG. 6 is a diagram which illustrates a function of returning back RM cells as BECN cells at line interfaces in an ATM switch using line interfaces as shown in FIG. 4.

When a forward RM cell reaches the ATM switch shown in FIG. 6, it may be returned back inside the line interfaces 30(1) to 30(N). For example, a forward RM cell is inputted from the physical layer controller 32(1) into the ingress side of the line interface 30(1), then routed by the routing switch 34, and thereafter inputted to the egress side of the line interface 30(N). In the case where extraordinary congestion occurs at the output port of the line interface 30(N), the forward RM cell may be moved in the line interface 30(N) from the egress side to the ingress side to become a BECN cell. In this case, the host CPU 46 can rewrite the payload at the point of time where the forward RM cell is stored in the temporary RAM 44 shown in FIG. 4. The forward RM cell is returned back in the line interface 30(N) to become a BECN cell, then switched by the routing switch 34, then inputted to the egress side of the line interface 30(1), and thereafter dispatched via the physical layer controller 32(1).

Next explained in detail are operations executed when the loop-back cells and BECN cells are processed inside the line interface 30.

Figure 7:
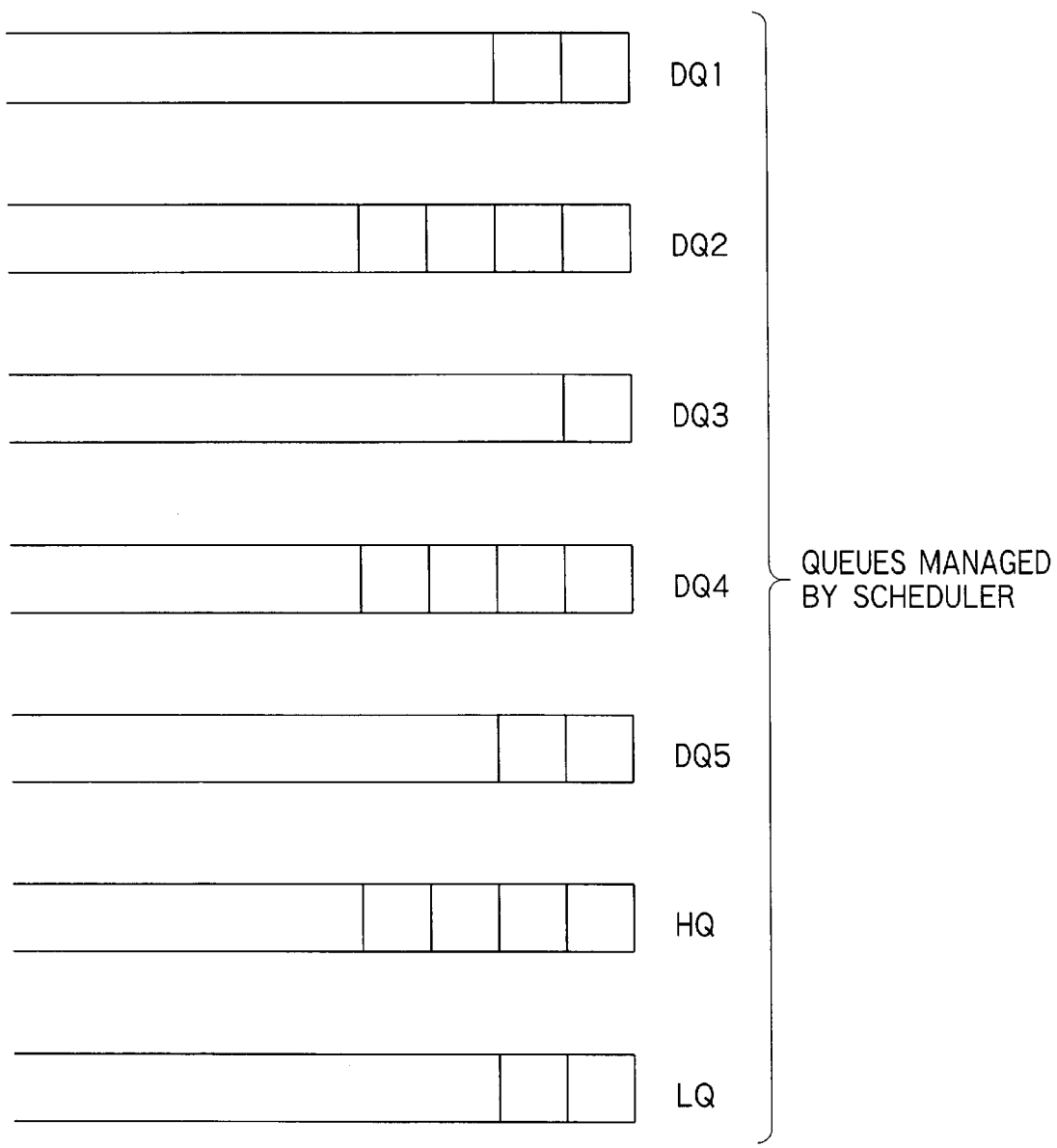
FIG. 7 is a diagram schematically shows aspects of queues formed in an ingress-side cell buffer.

FIG. 7 is a diagram that schematically shows aspects of queues formed in the ingress-side cell buffer 56 to enable the processing of returning back loop-back cells in the line interface 30 having the configuration of FIG. 4. As shown in FIG. 7, formed in the cell buffer 56 are data queues DQ1 through DQ5, host queue HQ, and loop-back queue LQ. That is, the loop-back queue LQ is provided additionally to the queues of the first embodiment. Although the priority of the loop-back queue can be determined as desired, the embodiment shown here assigns a lower priority than those of the data queues DQ1 through DQ5 and the host queue HQ.

Functions upon processing loop-back cells progress in the following manner.

1. When the ingress side of the physical layer interface 40 decides that an inputted ATM cell should be looped back on the basis of the content of the ATM cell and line information, it notifies the scheduler 54 that the ATM cell should be accumulated in the loop-back queue LQ.

2. According to the notice, the ingress-side scheduler 54 enqueues the ATM cell into the loop-back queue LQ.

3. When the host CPU 46 knows that the length of the loop-back queue LQ is 1 or more, it requests the ingress-side scheduler 54 to dequeue the loop-back queue LQ.

4. The ingress-side scheduler 54 is configured to sequentially dequeue the data queues DQ1 through DQ5, host queue HQ and loop-back queue LQ by successively selecting one having the highest priority for output. Therefore, scheduler 54 dequeues the loop-back cell from the loop-back queue LQ only after outputting all queues having higher priorities than that of the loop-back queue LQ. The loop-back cell dequeued from the loop-back queue LQ is stored in the temporary RAM 44.

5. Once the loop-back cell is stored in the temporary RAM 44, the host CPU 46 executes necessary processing to the loop-back cell. For example, the host CPU 46 rewrites a loop-back indication bit, which indicates whether the loop-back cell is before or after being returned back, from 1 to 0, and writes class information CI, which determines in which class the loop-back cell should be returned.

6. When the host CPU 46 finishes rewriting the loop-back cell, the host CPU 46 requests the egress-side scheduler 64 to enqueue it in the egress side.

7. The egress-side scheduler 64 enqueues the loop-back cell in one of the egress-side data queues DQ1 through DQ5, which is appointed by the class information CI. The loop-back cell enqueued in the egress side is dequeued by the egress-side scheduler 64 in the order of priorities of the data queues DQ1 through DQ5, and sent from the egress side of the physical layer interface 40 to a physical layer.

Figure 8A:
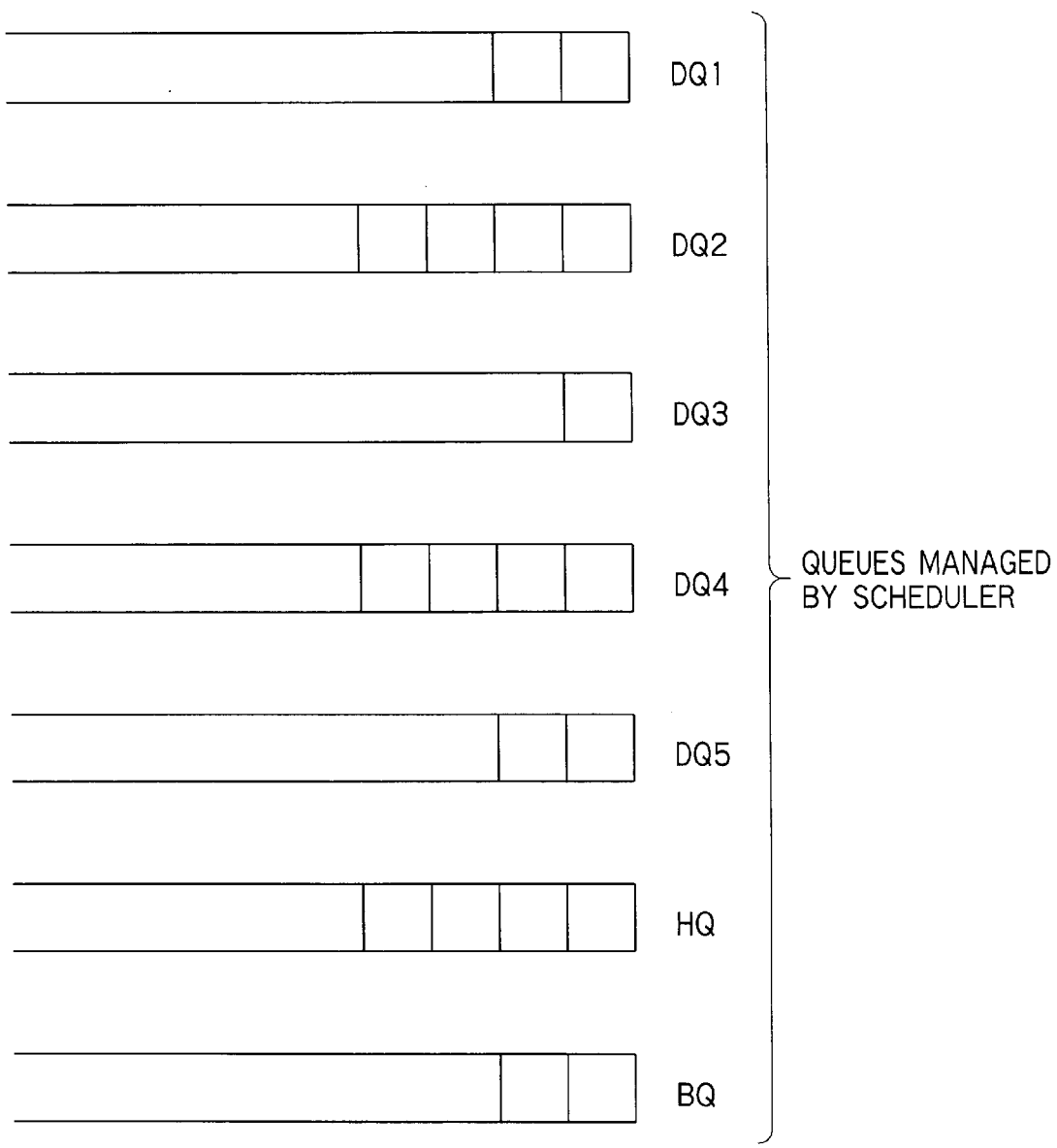
FIG. 8A is a diagram which schematically shows aspect of queues formed in an egress-side cell buffer.

Next explained are operations executed upon looping back a RM cell as a BECN cell in the line interface 30. FIG. 8A is a diagram that shows aspects of queues formed in the egress-side cell buffer 66 to enable return-back processing of a BECN cell in the line interface having the configuration shown in FIG. 4.

As shown in FIG. 8A, the cell buffer 66 includes data queues DQ1 through DQ5, host queue HQ and BECN queue BQ. That is, the BECN queue BQ is added as compared with the first embodiment. Although the priority of the BECN queue BQ can be determined as desired, the embodiment shown here assigns a lower priority than any priorities of the data queues DQ1 through DQ5 and the host queue HQ.

Operations proceed as follows when the BECN cell is processed.

1. When the switch interface 42 having received an RM cell decides that the RM cell should undergo the BECN processing (return-back) with reference to the contents of the inputted RM cell and line information, the switch interface 42 notifies the egress-side scheduler 64 that the RM cell should be accumulated as a BECN cell in the BECN queue BQ.

2. According to the notice, the egress-side scheduler 64 enqueues the BECN cell in the BECN queue of the cell buffer 66.

3. When the host CPU 46 detects that the length of the BECN cell is 1 or more, the host CPU 46 request the egress-side scheduler 64 to dequeue the BECN queue BQ.

4. The egress-side scheduler 64 is configured to sequentially dequeue the data queues DQ1 through DQ5, host queue HQ and BECN queue BQ by successively selecting one having the highest priority for output. Therefore, the scheduler 64 dequeues the BECN queue BQ after outputting all queues having higher priorities than that of the BECN queue BQ.

5. Once the BECN cell read out from the BECN queue BQ is written into the temporary RAM 44, the host CPU 46 executes necessary processing to the BECN cell. For example, the host CPU 46 writes class information CI of the ingress-side queue, which determines in which class the BECN cell should be returned back.

6. When the host CPU 46 completes rewriting the BECN cell, it request the ingress-side scheduler 54 to enqueue it in the ingress side.

7. The ingress-side scheduler 54 enqueues the BECN queue in one of the data queues DQ1 through DQ5, which is appointed by the class information CI.

8. The BECN cell enqueued in the ingress side is dequeued by the ingress-side scheduler 54 in the order of priorities of the data queues DQ1 through DQ5, and outputted from the ingress-side switch interface 42 to the routing switch 34.

Although the line interface 30 functions as explained above for loop-back cells and BECN cells, it functions similarly to the line interfaces 10 and 11 according to the first embodiment for ordinary ATM cells and ATM cells addressed to the host CPU 46.

More specifically, an ATM cell inputted into the physical layer interface 40 is once stored in the cell buffer 56 regardless that it is an ATM cell dispatched from the switch interface 42 or an ATM cell addressed to the host CPU 46. That is, any ATM cell dispatched from the switch interface 42 is accumulated in one of data queues DQ1 through DQ5 of a corresponding class in the cell buffer 56. An ATM cell addressed to the host CPU 46 is accumulated in the host queue HQ of the cell buffer 56.

The scheduler 54 controls the order of outputting ATM cells accumulated in the data queues DQ1 through DQ5 and the host queue HQ of the cell buffer 56, sends ATM cells, to be dispatched from the switch interface 42, from the cell buffer 56 to the switch interface 42, and sends ATM cells, addressed to the host CPU 46, from the cell buffer 56 to the temporary RAM 44. The host CPU 46 readout ATM cells stored in the temporary RAM 44, and executes necessary processing to them.

In the case where the host CPU 46 inserts an ATM cell, the host CPU 46 stores in the temporary RAM 44 the ATM cell to be inserted. The ATM cell to be inserted, which is stored in the temporary RAM 44, is accumulated in one of the data queues DQ1 through DQ5 of a corresponding class in the cell buffer 56. Then, the ATM cell to be inserted is dispatched from the switch interface 42 according to the order of priorities under control of the scheduler 54.

In contrast, the ATM cell inputted to the switch interface 42 is once stored in the cell buffer 66 regardless that it is an ATM cell to be dispatched from the physical layer interface 40 or an ATM cell addressed to the host CPU 46. That is, any ATM cell dispatched from the physical layer interface 40 is accumulated in corresponding one of the data queues DQ1 through DQ5 of the cell buffer 66. ATM cells addressed to the host CPU 46 are accumulated in the host queue HQ of the cell buffer 66.

The scheduler 64 controls the order of outputting ATM cells accumulated in the data queues DQ1 to DQ5 and the host queue HQ of the cell buffer 66, then sends ATM cells, to be sent from the physical layer interface 40, from the cell buffer 66 to the physical layer interface 40, and sends ATM cells, addressed to the host CPU 46, from the cell buffer 66 to the temporary RAM 44. The host CPU 46 read out ATM cells stored in the temporary RAM 44, and executes necessary processing to them.

As explained above, since the line interface 30 according to the instant embodiment is configured to store data of ATM cells addressed to the host CPU 46 in the cell buffers 56, 66 similarly to ordinary ATM cells, it needs no FIFO memory for storing data of ATM cells addressed to the host CPU 46. Therefore, hardware configuration can be simplified.

Additionally, ATM cells inserted by the host CPU 46 are also accumulated in data queues selected from data queues DQ1 through DQ5 in the cell buffers 56, 66 similarly to ordinary ATM cells so as to dispatch from the physical layer interface 40 or the switch interface 42 at a timing under control of the scheduler 54 or 64 in accordance with priorities, ATM cells can be inserted without disordering the stream of ATM cells. Therefore, it is possible to overcome the problem that ATM cells inserted from the host CPU 46 delaying the dispatch of ordinary ATM cells. Further, the line interface 30 does not need the cell insertion controller conventionally indispensable to control the timing of inserting ATM cells from the host CPU 46 into the flow of ordinary ATM cells.

Furthermore, since the line interface 30 enables processing movement of ATM cells from the ingress side to the egress side and movement of ATM cells from the egress side to the ingress side in a single temporary RAM 44, hardware can be saved in quantity. That is, since the line interface 30 having the ingress-side function and the egress-side function is made of a single chip, movements of ATM cells from upstream lines to downstream lines, or vice versa, can be processes within a single chip.

The invention is not limited to the foregoing embodiments, but can be modified in various modes. For example, the foregoing embodiments have been explained taking ATM switches dealing with fixed length packets as ATM cells, the invention is applicable to other-type packet switches as well.

Further, although the line interfaces 10, 11 according to the first embodiment shown in FIGS. 1 and 3 are configured to both ATM cells addressed to the host CPU 26 and ATM cells to be inserted by the host CPU 26 in a single temporary RAM 18, these two kinds of ATM cells may be stores separate RAMs. That is, as shown in FIGS. 8B and 8C, a temporary RAM 18A for storing the ATM cells addressed to the host CPU 26 and a temporary RAM 18B for storing the ATM cells to be inserted by the host CPU 26 may be provided separately.

The line interface 30 according to the second embodiment shown in FIG. 4 is configured to store ATM cells inputted from the ingress side toward the host CPU 46, ATM cells to be inserted into the ingress side by the host CPU 46, ATM cells inputted from the egress side toward the host CPU 46 and ATM cells to be inserted into the egress side by the host CPU 46 in a single temporary RAM 44. However, it may be modified to store these four kinds of ATM cells in separate RAMs each associated with a single kind of ATM cells or each associated with some of those four kinds of ATM cells.

Figure 8D:
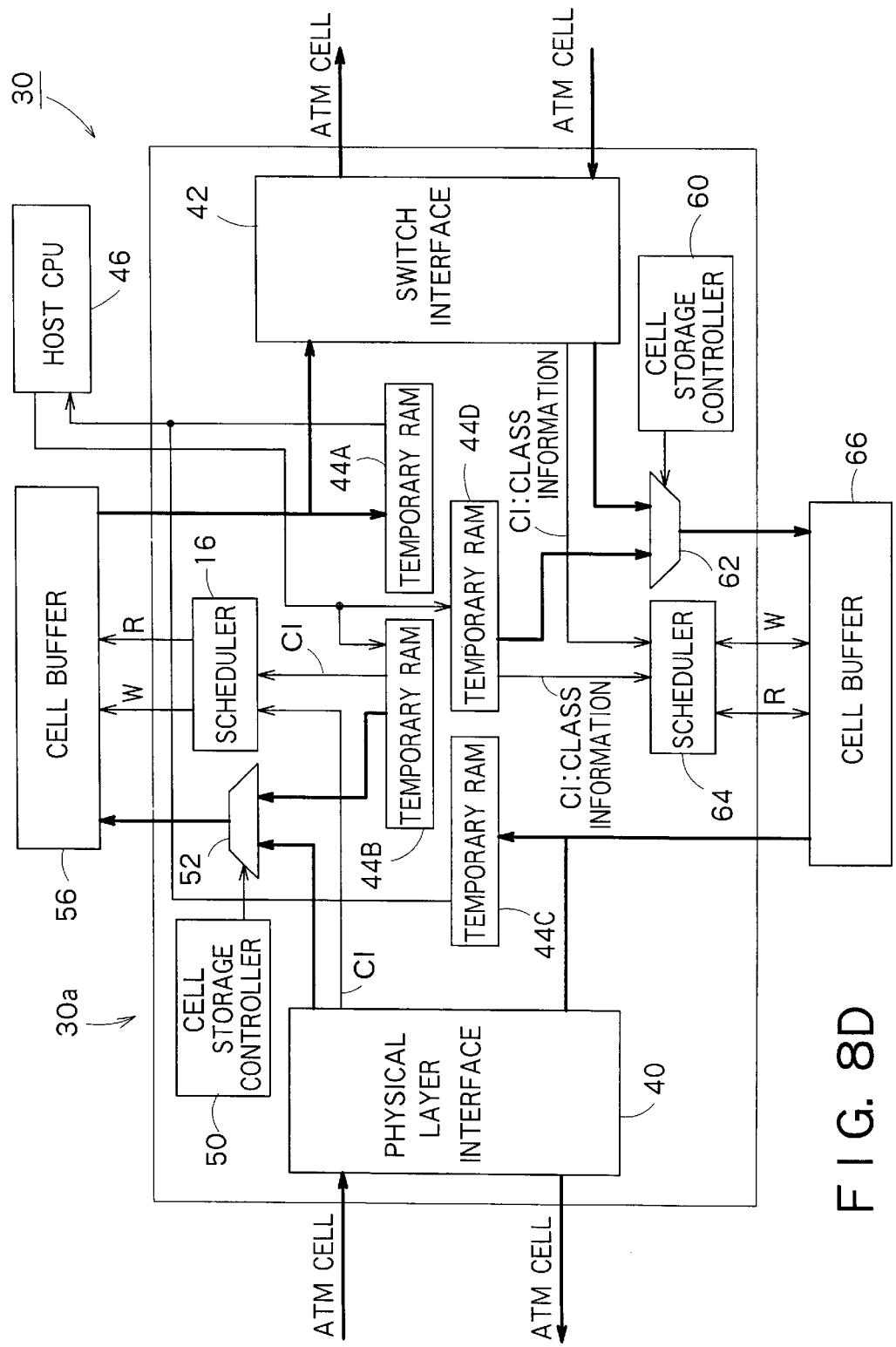
FIG. 8D is a block diagram showing a line interface which is made a modification to the second embodiment.

For example, as shown in FIG. 8D, a temporary RAM 44A for storing ATM cells inputted from the ingress side toward the host CPU 46, a temporary RAM 44B for storing ATM cells to be inserted into the ingress side by the host CPU 46, a temporary RAM 44C for storing ATM cells inputted from the egress side toward the host CPU 46 and a temporary RAM for storing ATM cells to be inserted into the egress side by the host CPU 46 may be provided separately.

Furthermore, in the line interface 30 according to the second embodiment shown in FIG. 4, the physical interface 40 may be divided into an ingress-side physical layer interface and an egress-side physical layer interface, and the switch interface 42 may be divided into an ingress-side switch interface and an egress-side switch interface.

As described above, according to the invention, since packets inputted into the input-side interface are classified at least into a first queue for accumulating packets to be outputted from the output-side interface stored in a buffer and a second queue for accumulating packets addressed to CPU and stored in a buffer, and the scheduler controls the order of outputting packets accumulated in the queues of the buffer to output the packets accumulated in the first queue to the output-side interface and output the packets accumulated in the second queue to a first storage device, the invention can omit the FIFO memory conventionally required for storing packets addressed to CPU.

Moreover, since the scheduler is configured to inserted packets inserted from CPU in the first queue formed in the buffer, it is possible to overcome the problem that insertion of packets into a flow of packets delays ordinary packets outputted from the output-side interface.

What is claimed is:

1. A line interface integrated circuit having an input-side interface supplied with packets and an output-side interface outputting the packets, comprising:
    a first storage device configured to temporarily store packets toward CPU and be accessed by the CPU when necessary; and
    a scheduler configured to classify packets outputted from the input-side interface at least into a first queue for accumulating packets to be outputted from the output-side interface and a second queue for accumulating packets addressed to CPU, and accumulate the packets in a buffer, the scheduler managing the order of outputting the packets accumulated in the queues of the buffer to output the packets accumulated in the first queue to the output-side interface and output the packets accumulated in the second queue to the first storage device.

2. The line interface integrated circuit according to claim 1 further comprising:
    a second storage device configured to temporarily store insertion packets inserted by the CPU, the scheduler accumulating the insertion packets stored in the second storage device in the first queue formed in the buffer.

3. The line interface integrated circuit according to claim 1 wherein the input-side interface is a physical layer interface connected to a physical layer controller, and the output-side interface is a switch interface connected to a routing switch.

4. The line interface integrated circuit according to claim 1 wherein the input-side interface is a switch interface connected to a routing switch and the output-side interface is a physical layer interface connected to a physical layer controller.

5. The line interface integrated circuit according to claim 2 wherein the first storage device and the second storage device are incorporated into a single storage device.

6. The line interface integrated circuit according to claim 1 wherein the packets are ATM cells.

7. A packet switch comprising:
at least one ingress-side physical layer controller connected to a physical layer which is an input side of the packets;
at least one ingress-side line interface device connected to the ingress-side physical layer controller;
a routing switch connected to the ingress-side line interface device;
at least one egress-side line interface device connected to the routing switch; and
at least one egress-side physical layer controller having one side connected to the egress-side line interface device and the other side connected to a physical layer which is the output side of the packets,
wherein each line interface device of the ingress-side line interface device and the egress-side line interface device comprises:
an input-side interface supplied with the packets;
an output-side interface outputting the packets;
a buffer supplied with packets outputted from the input-side interface and accumulating the packets classified at least into a first queue for accumulating packets to be outputted from the output-side interface and a second queue for accumulating packets addressed to CPU;
a first storage device configured to temporarily store packets outputted from the buffer toward the CPU and be accessed by the CPU when necessary; and
a scheduler configured to manage the order of outputting the packets accumulated in the queues of the buffer to output the packets accumulated in the first queue to the output-side interface and output the packets accumulated in the second queue to the first storage device.

8. The packet switch according to claim 7 wherein each line interface device further comprises:
a second storage device configured to temporarily store insertion packets inserted by the CPU, the scheduler accumulating the insertion packets stored in the second storage device in the first queue formed in the buffer.

9. The packet switch according to claim 8 wherein the first storage device and the second storage device are incorporated into a single storage device.

10. A line interface integrated circuit having a physical layer interface connected to a physical layer controller to input and output packets, and a switch interface connected to a routing switch to output and input packets, comprising:
first and second storage devices configured to temporarily store packets toward CPU and be accessed by the CPU when necessary;
an ingress-side scheduler configured to classify the packets outputted from the physical layer interface at least into a first queue for accumulating packets to be outputted from the switch interface and a second queue for accumulating packets addressed to the CPU, and accumulate the packets in an ingress-side buffer, the ingress-side scheduler managing the order of outputting the packets accumulated in the queues of the ingress-side buffer to output the packets accumulated in the first queue to the switch interface and output the packets accumulated in the second queue to the first storage device; and
an egress-side scheduler configured to classify the packets outputted from the switch interface at least into a third queue for accumulating packets to be outputted from the physical layer interface and a fourth queue for accumulating packets addressed to the CPU, and accumulate the packets in an egress-side buffer, the egress-side scheduler managing the order of outputting the packets accumulated in the queues of the egress-side buffer to output the packets accumulated in the third queue to the physical layer interface and output the packets accumulated in the fourth queue to the second storage device.

11. The line interface integrated circuit according to claim 10 further comprising:
a third storage device configured to temporarily store first insertion packets inserted by the CPU to be outputted from the switch interface, and a fourth storage device configured to temporarily store second insertion packets inserted by the CPU to be outputted from the physical layer interface,
the ingress-side scheduler accumulating the first insertion packets stored in the third storage device in the first queue formed in the ingress-side buffer,
the egress-side scheduler accumulating the second insertion packets stored in the fourth storage device in the third queue formed in the egress-side buffer.

12. The line interface integrated circuit according to claim 11 wherein the first to fourth storage devices are incorporated into a single storage device.

13. The line interface integrated circuit according to claim 10 wherein, when a packet is inputted into the physical layer interface and should be outputted from the physical interface, the ingress-side scheduler accumulates the packet in a fifth queue formed in the ingress-side buffer,
the CPU executes processing to the packet accumulated in the fifth queue, and
the egress-side scheduler accumulates it in the third queue formed in the egress-side buffer.

14. The line interface integrated circuit according to claim 10 wherein, when a packet is inputted into the switch interface and should be outputted from the switch interface, the egress-side scheduler accumulates the packet in a sixth queue formed in the egress-side buffer,
the CPU executes processing to the packet accumulated in the sixth queue, and
the ingress-side scheduler accumulates it in the first queue of the ingress-side buffer.

15. The line interface integrated circuit according to claim 10 wherein the packets are ATM cells.

16. A packet switch comprising:
at least one physical layer controller connected to a physical layer;
at least one line interface device connected to the physical layer controller; and
a routing switch connected to the line interface device,
wherein the line interface device comprises:
a physical layer interface connected to the physical layer controller to input and output packets;
a switch interface connected to the routing switch to output and input packets;
an ingress-side buffer supplied with the packets outputted from the physical layer interface, and accumulating the packets classified at least into a first queue for accumulating packets to be outputted from the switch interface and a second queue for accumulating packets addressed to CPU;
a first storage device configured to temporarily store packets outputted from the ingress-side buffer toward the CPU and be accessed by the CPU when necessary;

an ingress-side scheduler configured to manage the order of outputting the packets accumulated in the queues of the ingress-side buffer to output the packets accumulated in the first queue to the switch interface and output the packets accumulated in the second queue to the first storage device;

an egress-side buffer supplied with the packets outputted from the switch interface, and accumulating the packets classified at least into a third queue for accumulating packets to be outputted from the physical layer interface and a fourth queue for accumulating packets addressed to the CPU;

a second storage device configured to temporarily store packets outputted from the egress-side buffer toward the CPU and be accessed by the CPU when necessary; and an egress-side scheduler configured to manage the order of outputting the packets accumulated in the queues of the egress-side buffer to output the packets accumulated in the third queue to the physical layer interface and output the packets accumulated in the fourth queue to the second storage device.

17. The packet switch according to claim 16 wherein the line interface further comprises a third storage device configured to temporarily store first insertion packets inserted by the CPU to be outputted from the switch interface, and a fourth storage device configured to temporarily store second insertion packets inserted by the CPU to be outputted from the physical layer interface, the ingress-side scheduler accumulating the first insertion packets stored in the third storage device in the first queue formed in the ingress-side buffer, the egress-side scheduler accumulating the second insertion packets stored in the fourth storage device in the third queue formed in the egress-side buffer.

18. The packet switch according to claim 17 wherein the first to fourth storage devices are incorporated into a single storage device.

19. The packet switch according to claim 16 wherein the ingress-side buffer further includes a fifth queue for accumulating packets, when a packet is inputted into the physical layer interface and should be outputted from the physical interface, the CPU executing processing to the packet accumulated in the fifth queue to accumulate it in the third queue of the egress-side buffer.

20. The packet switch according to claim 16 wherein the egress-side buffer further includes a sixth queue for accumulating packets, when a packet is inputted into the switch interface and should be outputted from the switch interface, the CPU executing processing to the packet accumulated in the sixth queue to accumulate it in the first queue of the ingress-side buffer.

* * * * *

UNITED STATES PATENT AND TRADEMARK OFFICE
CERTIFICATE OF CORRECTION

PATENT NO.   : 6,785,290 B1
DATED        : August 31, 2004
INVENTOR(S)  : Fujisawa et al.

It is certified that error appears in the above-identified patent and that said Letters Patent is hereby corrected as shown below:

Title page,
Item [*] Notice, delete the phrase "by 820" and insert -- by 847 days --

Signed and Sealed this

Tenth Day of May, 2005

JON W. DUDAS
*Director of the United States Patent and Trademark Office*